(12) United States Patent
Suzic (10) Patent No.: US 10,114,180 B2
(45) Date of Patent: Oct. 30, 2018

(54) PLUG CONNECTOR (71) Applicant: Reichle & De-Massari AG, Wetzikon (CH)

(72) Inventor: Dusko Suzic, Dubendorf (CH)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 15/355,291

(22) Filed: Nov. 18, 2016

(65) Prior Publication Data
US 2017/0363818 A1 Dec. 21, 2017

(30) Foreign Application Priority Data
Jun. 16, 2016 (DE) .................... 20 2016 103 178 U (51) Int. Cl.
G02B 6/38 (2006.01)

(52) U.S. Cl.
CPC ......... *G02B 6/3893* (2013.01); *G02B 6/3831* (2013.01); *G02B 6/3879* (2013.01); *G02B 6/3887* (2013.01); *G02B 6/3895* (2013.01)

(58) Field of Classification Search
None
See application file for complete search history.

(56) References Cited

U.S. PATENT DOCUMENTS

| | | | | |
|---|---|---|---|---|
| 6,357,934 B1* | 3/2002 | Driscoll | ............... | G02B 6/3869 385/59 |
| 6,550,979 B1* | 4/2003 | Fleenor | ................ | G02B 6/3843 385/139 |
| 7,712,970 B1 | 5/2010 | Lee | | |
| 8,783,968 B2* | 7/2014 | Adams | ................. | G02B 6/3879 385/134 |
| 9,285,551 B2* | 3/2016 | Lin | ....................... | G02B 6/3887 |
| 9,684,130 B2* | 6/2017 | Veatch | ................. | G02B 6/3831 |
| 2011/0274437 A1 | 11/2011 | Jones et al. | | |
| 2014/0016902 A1* | 1/2014 | Pepe | .................... | G02B 6/3893 385/76 |
| 2014/0169727 A1* | 6/2014 | Veatch | ................. | G02B 6/3831 385/11 |
| 2015/0049989 A1* | 2/2015 | Yoshizaki | ............ | G02B 6/3825 385/78 |
| 2015/0212282 A1* | 7/2015 | Lin | ....................... | G02B 6/3893 385/76 |
| 2016/0109661 A1 | 4/2016 | Foung | | |
| 2017/0363818 A1* | 12/2017 | Suzic | .................... | G02B 6/3879 |

FOREIGN PATENT DOCUMENTS

FR 2220889 A1 10/1974
WO 2015/103783 A1 7/2015

OTHER PUBLICATIONS

Extended European Search Report dated Nov. 13, 2017 issued in corresponding EP application No. 17172114.5.

* cited by examiner

Primary Examiner — Tina M Wong
(74) Attorney, Agent, or Firm — Posz Law Group, PLC (57) ABSTRACT

A plug connector, in particular an optical plug connector, has a plug unit comprising at least one plug element which has at least one locking element, and with an actuation unit comprising at least one actuation element which is translationally displaceable with respect to the plug unit for the purpose of actuating the locking element.

20 Claims, 5 Drawing Sheets

PLUG CONNECTOR

CROSS REFERENCE TO RELATED APPLICATION

This application is based on German Patent Application No. 20 2016 103 178.8 filed on Jun. 16, 2016, the disclosure of which is incorporated herein by reference.

STATE OF THE ART

From EP 2 664 951 A1 and/or from EP 2 063 497 A1 optical plug connectors are known, which have at least one plug element with a locking arm, and have an actuation unit comprising an actuation element for actuating the locking arm, which is translationally displaceable with respect to the plug element.

The objective of the invention is, in particular, to make a generic plug connector available having improved characteristics as regards flexibility. The objective is achieved by the characterizing features of claims 1 to 6, while advantageous implementations and further developments of the invention may become apparent from the subclaims.

ADVANTAGES OF THE INVENTION

The invention relates to a plug connector, in particular optical plug connector, in particular for data transmission and/or telecommunication, with a plug unit comprising at least one plug element which has at least one locking element, and with an actuation unit comprising at least one actuation element which is in particular provided for an actuation, in particular locking, unlocking and/or releasing, of the locking element and which is translationally displaceable, in particular linearly displaceable in a longitudinal extension direction of the plug element, with respect to the plug unit for the purpose of actuating, in particular locking, unlocking and/or releasing, the locking element. "Provided" is in particular to mean specifically programmed, designed and/or equipped. By an object being provided for a certain function is in particular to be understood that the object fulfills and/or implements said certain function in at least one application state and/or operative state. The plug connector may herein be embodied as any kind of a magnetic, electrical and/or advantageously optical plug connector, in particular as a single, simplex, dual, duplex, multiple and/or multiplex plug connector.

By a "plug unit" is in particular to be understood, in this context, a unit which is provided for coupling with at least one further plug unit, in particular at least one further plug unit that corresponds to the plug unit, advantageously for plugging into the further plug unit, which is advantageously embodied as a plug socket, for which purpose said unit in particular comprises at least one plug element. Advantageously the plug unit is herein provided for establishing and/or facilitating at least one magnetic, electrical and/or advantageously optical connection between two objects. Beyond this the plug element advantageously comprises a plug base body which the locking element is arranged and advantageously fixated on. Herein the plug element is preferably implemented as an advantageously optical RJ plug element and/or as an advantageously optical simplex plug element, e.g. an LC simplex plug element. The locking element is moreover advantageously embodied as a locking arm, particularly preferably as a latching arm and/or latching lug and in particular for the purpose of locking the plug element and/or the plug unit in the further plug unit. The plug unit further comprises advantageously at least one holding unit, which is in particular provided at least for holding the plug element. By a "longitudinal extension direction" of an object is in particular a direction to be understood which runs in parallel to a direction of a maximum extension of the object.

An "actuation unit" is furthermore in particular to be understood as a unit which is advantageously coupled and/or couplable to the plug unit, in particular in a force-fit and/or form-fit fashion, and which is in at least one application state, in particular in an uncoupled and/or unplugged state of the plug unit in the further plug unit, provided for locking the plug unit, and/or which is in at least one further application state, in particular in a coupled and/or plugged-in state of the plug unit in the further plug unit, provided for unlocking the plug unit, in particular in such a way that the plug unit is removable from and/or out of the further plug unit. For this purpose the actuation unit in particular comprises at least one actuation element, which is in particular in the application state in an operative connection with the locking element and advantageously directly contacts the locking element, and which especially advantageously comprises at least one run-on slope for actuating, in particular directly actuating, the locking element, wherein the run-on slope moves the locking element toward the plug base body, in particular when the actuation element is translationally displaced, thus in particular allowing and/or releasing a locking of the locking element.

In particular, the plug unit may herein also comprise at least one further plug element, advantageously with at least one further plug base body and/or at least one further locking element, wherein the further locking element is advantageously embodied as a locking arm, particularly preferentially as a latching arm and/or latching lug, and is in particular provided for locking the further plug element and/or the plug unit in the further plug unit. Advantageously the holding unit is in this case provided for holding the further plug element. Herein at least the further locking element is advantageously at least substantially structurally identical to the locking element. Especially advantageously the further plug element is at least substantially structurally identical to the plug element. By "at least substantially structurally identical" objects are herein in particular objects to be understood which have external shapes that are embodied at least substantially analogously to each other, which may however differ from each other in particular in at least one feature, e.g. an inner structure, a reset force, a tension force and/or a functionality. However, the at least substantially structurally identical objects are preferentially identical to each other, except regarding manufacturing tolerances and/or in the range of tolerances of manufacturing technicalities and/or of standardized tolerances. Moreover the actuation unit comprises in this case preferably at least one further actuation element which is in particular in the application state in an operative connection to the further locking element, which is advantageously in direct contact to the further locking element, and which is in particular provided for actuating, in particular locking, unlocking and/or releasing the further locking element, and is advantageously translationally displaceable, in particularly linearly displaceable in a longitudinal extension direction of the further plug element, with respect to the plug unit in particular for the purpose of locking, unlocking and/or releasing the further locking element. Particularly advantageously the further actuation element herein comprises, for actuating, in particular directly actuating, the further locking element, at least one further run-on slope which, in particular when the further actuation element is translationally displaced, moves the further locking element toward the further plug base body, thus in particular allowing and/or releasing a locking of the further locking element. Preferably the further actuation element is at least substantially structurally identical to the actuation element. Particularly preferably the further actuation element is connected to the actuation element via a one-part implementation, in particular in such a way that the actuation element and the further actuation element form a common structural element. "Via a one-piece implementation" is in particular to mean, in this context, at least connected by substance-to-substance bond.

The substance-to-substance bond may be established, for example, by an adhesive-bonding process, an injection-molding process, a welding process, a soldering process and/or another type of process. Advantageously "in a one-part implementation" is to mean formed of one piece and/or in one piece. Preferentially said one piece is made from one single blank, one mass and/or one cast, e.g. in an extrusion procedure, in particular a one-component and/or multi-component extrusion procedure, and/or in an injection-molding procedure, in particular a one-component and/or multi-component injection-molding procedure.

According to one aspect of the invention, which is implementable in particular on its own or advantageously in addition to other aspects of the invention, it is proposed that in a fully assembled state, in particular the application state, of the actuation element, the plug element is rotatable, in particular toollessly and/or without using an additional tool, with respect to the actuation element, advantageously about a longitudinal axis of the plug element, in particular by at least 45°, advantageously by at least 90°, preferably by at least 135° and especially preferably by at least 180° with respect to the actuation element. In particular in case the plug unit comprises the further plug element, it is further proposed that in a fully assembled state, in particular the application state, of the further actuation element the further plug element is rotatable, in particular toollessly and/or without using an additional tool, with respect to the further actuation element, advantageously about a longitudinal axis of the further plug element, in particular by at least 45°, advantageously by at least 90°, preferably by at least 135° and especially preferably by at least 180° with respect to the further actuation element. In particular, the holding unit is in this case provided for holding the plug element and/or the further plug element in such a way that the plug element and/or the further plug element are/is movable and advantageously rotatable. Preferably the plug element and/or the further plug element are herein rotatable with respect to the holding unit. The plug element and the further plug element may herein be rotatable, for example, in a same direction, viewed in the direction of the longitudinal axis of the plug element and/or of the longitudinal axis of the further plug element. Preferably, however, the plug element and the further plug element are rotatable in respectively opposite directions, viewed in the direction of the longitudinal axis of the plug element and/or of the longitudinal axis of the further plug element. Particularly preferably the longitudinal axis of the plug element and the longitudinal axis of the further plug element are herein oriented at least substantially parallel to each other. "At least substantially parallel" is herein in particular to mean an orientation of a direction with respect to a reference direction, in particular in a plane, the direction differing from the reference direction in particular by less than 8°, advantageously by less than 5° and especially advantageously by less than 2°. This implementation allows providing a plug connector having improved characteristics as regards flexibility. In particular, advantageously an orientation of a plug element and/or of the plug elements is re-adjustable and/or a minimum distance, in particular a minimum axial distance, between the plug elements is variable. Beyond this, a polarity of the plug element and/or of the plug elements is advantageously flexibly and/or easily modifiable.

According to a further aspect of the invention, which is implementable in particular on its own or advantageously in addition to the above-mentioned aspect of the invention, it is proposed that the plug unit comprises at least one holding unit, in particular the aforementioned holding unit, having at least two holding parts which are embodied separately and can in particular be separated and/or spaced apart from each other, and which are, in a connected state, provided at least for holding the plug element and/or the further plug element, advantageously in such a way that the plug element and/or the further plug element are/is movable, advantageously rotatable. Herein the holding parts are in the connected state connected to each other in a force-fit and/or form-fit fashion. Preferably the holding parts are implemented at least substantially mirror-symmetrically. Particularly preferably the holding parts are at least substantially structurally identical. By an object being embodied "at least substantially mirror-symmetrically" to a further object is in particular to be understood that a reflection of the object through a defined and/or definable mirror plane differs from the further object by a volume portion of maximally 15%, preferably no more than 10% and particularly preferably maximally 5%. By way of this implementation, a plug connector having improved characteristics regarding flexibility can be made available. In particular, an assembly and/or disassembly of the plug connector may herein be simplified. Furthermore, in particular an advantageous holding of the plug element and/or the plug elements is achievable. In addition efficiency, in particular regarding manufacturing and/or costs, may be enhanced.

According to a further aspect of the invention, which is implementable in particular on its own or advantageously in addition to the aforementioned aspects of the invention and is preferably combinable with at least some, advantageously at least a major part and preferably all of the aforementioned aspects, it is proposed that the actuation unit, in particular the actuation element and/or the further actuation element, is in an assembled state connected to the plug unit, advantageously the holding unit, via a dovetail connection. In particular, the plug unit, advantageously the holding unit, comprises in this case at least one dovetail-connection element. Moreover the actuation unit, in particular the actuation element and/or the further actuation element, comprises in particular at least one, advantageously precisely one dovetail-connection element which is embodied correspondingly to the dovetail connection element. It is advantageously proposed that the plug unit comprises, in particular for connecting to the actuation unit, in particular the actuation element and/or the further actuation element, at least two dovetail-connection elements, in particular a first dovetail-connection element and a second dovetail-connection element. Advantageously the actuation unit, in particular the actuation element and/or the further actuation element, is optionally connectable to one of the dovetail-connection elements. Especially advantageously the dovetail-connection elements, in particular the first dovetail-connection element and the second dovetail-connection element, are herein arranged on respectively opposite sides of the plug unit, in particular of the holding unit. Preferentially on each of the holding parts precisely one of the dovetail-connection elements is arranged. In particular, the first dovetail-connection element is herein arranged on a first holding part of the holding parts and the second dovetail-connection element is arranged on a second holding part—of the holding parts. By way of this implementation, a plug connector with improved characteristics regarding flexibility can be made available. In particular, an advantageously simple and/or quick assembly and/or disassembly of the plug connector is herein achievable. Furthermore in particular an advantageous connection of the actuation element and/or the actuation elements to the plug unit is achievable.

According to a further aspect of the invention, which is implementable in particular on its own or advantageously in addition to the aforementioned aspects of the invention and is preferably combinable with at least some, advantageously with at least a major part and preferably all of the aforementioned aspects, it is proposed that the plug connector comprises an optical display unit which has at least one display element which is provided for displaying at least one display information that differs from a trademark logo. In particular, the display unit may herein comprise precisely one display element and/or advantageously a plurality of display elements, e.g. at least two display elements, at least three display elements and/or at least four display elements, wherein in particular at least one of the display elements may be provided for additionally displaying a trademark logo. In this context, a "display element" is in particular to be understood as an element which is, in at least one display state and/or permanently, provided for optically displaying a display information, in particular a display information perceivable by a user, and/or a signal, in particular a signal perceivable by a user, in particular a display signal. The display element could herein be embodied, for example, as a lighting element, in particular as an LED and/or as an OLED. Particularly advantageously, however, the display unit comprises at least one display element which is embodied as an inscription space, in particular an inscribable inscription space, and/or at least one display element which is provided for showing a QR code. The display unit could furthermore be at least partly arranged on the plug unit. It is however advantageously proposed that the display unit is arranged and/or fixated at least partly, preferably at least to a major part and particularly preferably entirely at the actuation unit, in particular the actuation element and/or the further actuation element. By the term "at least to a major part" is herein in particular to be understood by at least 55%, advantageously at least 65%, preferably at least 75%, especially preferentially at least 85% and particularly advantageously at least 95%. Especially advantageously the display unit is embodied at least partly in a one-part implementation with the actuation unit, in particular the actuation element and/or the further actuation element. By an object being embodied "at least partly in a one-part implementation" with a further object is in particular to be understood, in this context, that the objects share at least one structural element and/or at least one structural element of the object, and/or the object is connected and/or embodied in a one-part implementation with at least one structural element of the further object and/or with the further object. Preferably, however, all structural components of the object are embodied in a one-part implementation with at least one structural component of the further object. Advantageously the display unit further comprises at least one display element which is, in an assembled state and/or operation state, arranged on a same side of the plug connector, in particular of the plug unit and/or of the actuation unit, as the locking element and/or the further locking element. Moreover the display unit preferably comprises at least one further display element which is, in an assembled state and/or operation state, arranged on a side of the plug connector, in particular of the plug unit and/or of the actuation unit, that is situated opposite the locking element and/or the further locking element. By this implementation a plug connector having improved characteristics regarding flexibility may be provided. In particular, this allows distinguishing advantageously quickly and/or easily a plurality of plug connectors, which are in particular embodied at least substantially identically. Beyond this, an advantageously individual adaptation of a display information is achievable, e.g. when using an inscription space.

According to a further aspect of the invention, which is implementable in particular on its own or advantageously in addition to the aforementioned aspects of the invention and is preferably combinable with at least some, advantageously with at least a major part and preferably all of the aforementioned aspects, it is proposed that the plug connector comprises an identification unit which is, in at least one operation state, provided for supplying at least one identification information, in particular for the purpose of identifying, advantageously unambiguously identifying, the plug connector, an operative status of the plug connector and/or for operation control of the plug connector. By an "identification unit" is herein in particular a unit to be understood, in particular an electrical and/or electronical unit, which is in particular provided, in at least one identification state, for generating and/or supplying an identification information, advantageously an electro-magnetic identification signal, which identification information is in particular not directly visible for a user. Preferentially the identification information can herein be read out via a reader device. Advantageously the identification unit herein comprises at least one transponder, in particular an RFID transponder, advantageously with at least one RFID chip. The identification unit could herein be arranged, for example, at least partly at the actuation unit. Advantageously it is, however, proposed that the identification unit is arranged and/or fixated on the plug unit at least partly, preferably at least to a major part and particularly preferably entirely. Especially advantageously the identification unit is herein connected to the plug unit, advantageously the holding unit, in a force-fit and/or form-fit fashion and is preferably free of a substance-to-substance bond with the plug unit. Furthermore the identification unit is preferably in an assembled state connected to the plug unit, advantageously the holding unit, via a further dovetail connection. In particular, the plug unit, advantageously the holding unit, comprises in this case at least one further dovetail-connection element. In addition the identification unit in particular comprises at least one, advantageously precisely one dovetail-connection element, which is embodied corresponding to the further dovetail-connection element. It is advantageously proposed that, in particular for the purpose of connecting to the identification unit, the plug unit comprises at least two further dovetail-connection elements, in particular a first further dovetail-connection element and a second further dovetail-connection element. Advantageously the identification unit is optionally connectable to one of the further dovetail-connection elements. Especially advantageously the further dovetail-connection elements, in particular the first further dovetail-connection element and the second further dovetail-connection element, are herein arranged on respectively opposite sides of the plug unit, in particular of the holding unit. Preferentially precisely one of the further dovetail-connection elements is arranged on each of the holding parts. In particular, herein the first further dovetail-connection element is arranged on a first holding part of the holding parts and the second further dovetail-connection element is arranged on a second holding part of the holding parts. According to a particularly preferred implementation of the invention, the further dovetail-connection elements are identical to the dovetail-connection elements. Advantageously herein the identification unit and the actuation unit, in particular the actuation element and/or the further actuation element, are in the assembled state connected to dovetail-connection elements of the plug unit which are situated opposite each other, and are preferably, at least to a major part, arranged on respectively opposite sides of the plug unit. By this implementation a plug connector with improved characteristics regarding flexibility can be made available. In particular, an advantageously easy identification is thus achievable. Beyond this, an advantageously simple, quick and/or flexible assembly and/or disassembly of the identification unit is achievable.

According to a further aspect of the invention, which is implementable in particular on its own or advantageously in addition to the aforementioned aspects of the invention and is preferably combinable with at least some, advantageously with at least a major part and preferably all of the aforementioned aspects, it is proposed that the actuation unit comprises at least one additional actuation element which is provided for actuating, in particular optionally, preferably only indirectly actuating, in particular locking, unlocking and/or releasing the locking element. In particular in case of the plug unit comprising the further plug element, it is additionally proposed that the additional actuation element is provided for actuating, in particular optionally, preferably only indirectly actuating, in particular locking, unlocking and/or releasing the further locking element. Preferentially the additional actuation element is herein free of a direct contact to the locking element and/or the further locking element. Advantageously the additional actuation element is in the assembled state connected and/or connectable to the locking element and/or the further locking element by means of the actuation element and/or of the further actuation element. Preferably the additional actuation element is translationally displaceable with respect to the plug unit, in particular linearly displaceable in a longitudinal extension direction of the plug element and/or the further plug element. It is further proposed that the additional actuation element may be embodied in a one-part implementation with the actuation element and/or the further actuation element. Advantageously, however, the additional actuation element is embodied separate and/or apart from the actuation element and/or the further actuation element. The additional actuation element could herein be embodied, for example, as a tension element, e.g. a tension lug, a tension tape and/or as an in particular dimensionally stable tension rod. According to a particularly advantageous implementation of the invention, the additional actuation element is embodied as a cable anti-kink element. The additional actuation element could in this case be embodied, for example, at least partly as an elastomer. Especially preferentially, however, the additional actuation element consists at least partly, preferably at least to a major part and particularly preferably entirely, of a thermoplast, e.g. polypropylene, as a result of which in particular advantageous stability regarding axial tension forces and/or pressure forces and simultaneously advantageous flexural mobility are achievable. Due to this implementation, a plug connector may be made available having improved characteristics regarding flexibility. In particular, a particularly simple, quick and/or construction-space efficient actuation of the plug connector is thus achievable. Moreover a plug connector density and/or a number of plug connectors may be increased in a limited area, e.g. a computing center and/or a server room, as a result of which efficiency regarding construction space, structural elements and/or costs may be improved.

According to a further aspect of the invention, which is implementable in particular on its own or advantageously in addition to the aforementioned aspects of the invention and is preferably combinable with at least some, advantageously with at least a major part and preferably all of the aforementioned aspects, it is proposed that the plug connector comprises an orientation unit, which is provided for changing in an assembly process, advantageously toollessly and/or without using an additional tool, a minimum distance between the plug element and the further plug element, in particular an axial distance and/or axle spacing, in particular a distance that is perpendicular to a longitudinal extension direction of the plug element and/or the further plug element. By an "orientation unit" is in particular, in this context, a unit to be understood which, in an assembled state, comprises at least one operative connection to the plug element and/or the further plug element, and is advantageously provided for at least partly contacting and/or supporting the plug element and/or the further plug element, in particular for the purpose of defining an orientation of the plug element and the further plug element with respect to each other. Advantageously the orientation unit is herein provided to act together with the holding unit for changing and/or defining the minimum distance between the plug element and the further plug element. Preferably the orientation unit is embodied in a one-part implementation. The orientation unit may herein be embodied in a one-part implementation with the plug unit. Preferentially, however, the orientation unit is embodied separately from the plug unit. In this case, the orientation unit may in particular be embodied in a one-part implementation with the identification unit. Alternatively or additionally, the orientation unit may be embodied in a one-part implementation with the display unit and/or in an entirely separate fashion. By this implementation, a plug connector having improved characteristics regarding flexibility may be made available. In particular, an orientation of a plug element and/or of the plug elements is herein advantageously adjustable, and/or a minimum distance, in particular axial distance, between the plug elements may be adapted.

The plug connector is herein not to be limited to the applications and implementations described above. In particular, for fulfilling a functionality herein described, the plug connector may comprise a number of respective elements, structural components and units that differs from a number mentioned here.

DRAWINGS

Further advantages may become apparent from the following description of the drawings. In the drawings exemplary embodiments of the invention are shown. The drawings, the description and the claims contain a plurality of features in combination. The person having ordinary skill in the art will purposefully also consider the features separately and will find further expedient combinations.

It is shown in.

DESCRIPTION OF THE EXEMPLARY EMBODIMENTS

Figure 1:
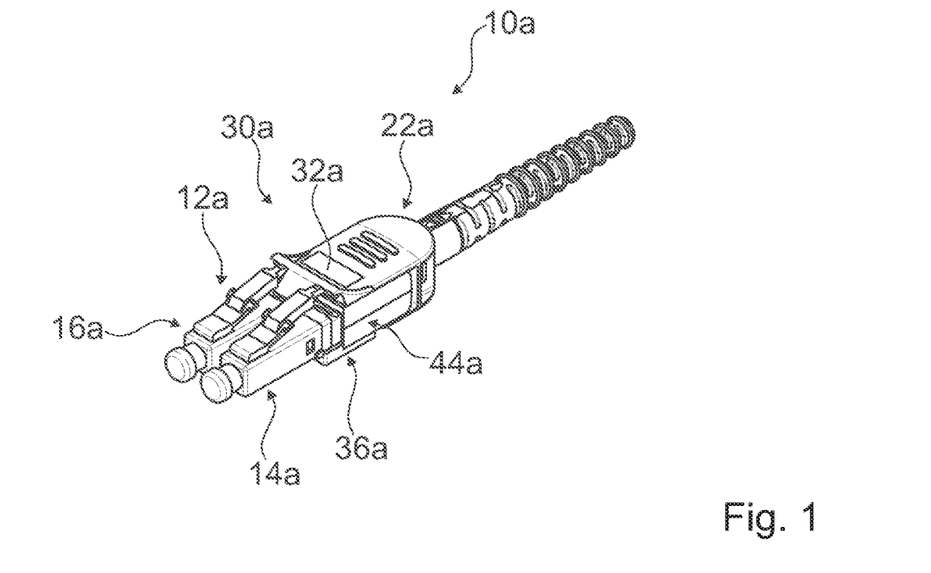
FIG. 1 a plug connector which is exemplarily embodied as an optical plug connector, in a first perspective view, FIG. 2 the plug connector in a second perspective view, FIG. 3 the plug connector in an exploded view, FIG. 4 the plug connector in an enlarged presentation, FIG. 5 another exemplary embodiment of a plug connector, in a first perspective view, FIG. 6 the plug connector of FIG. 5 in a second perspective view, FIG. 7 the plug connector of FIG. 5 in an exploded view, FIG. 8 a further exemplary embodiment of a plug connector, in an exploded view, and FIG. 9 the plug connector of FIG. 8 in a second perspective view.
Figure 2:
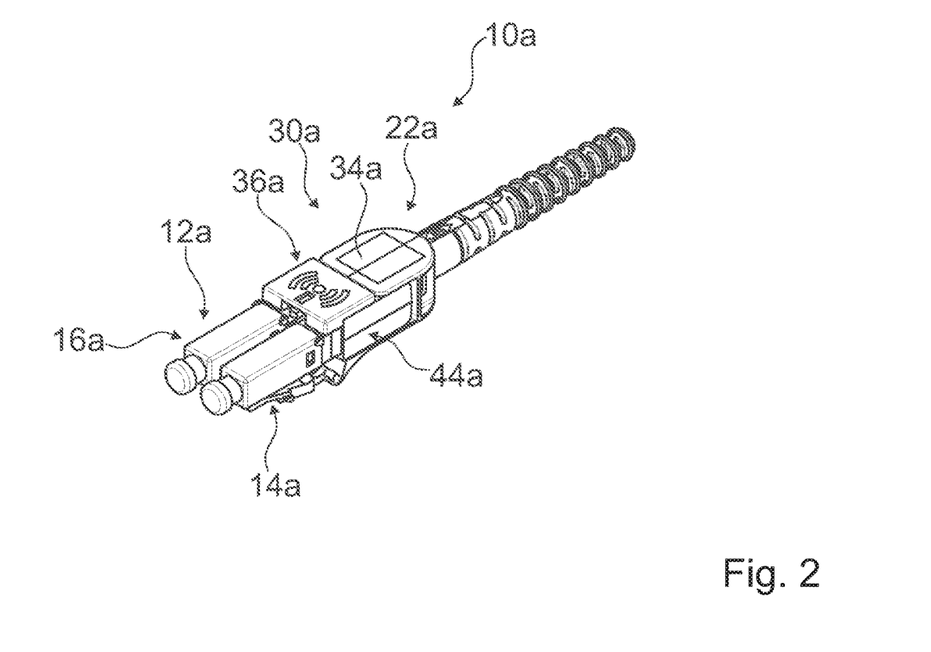
Figure 3:
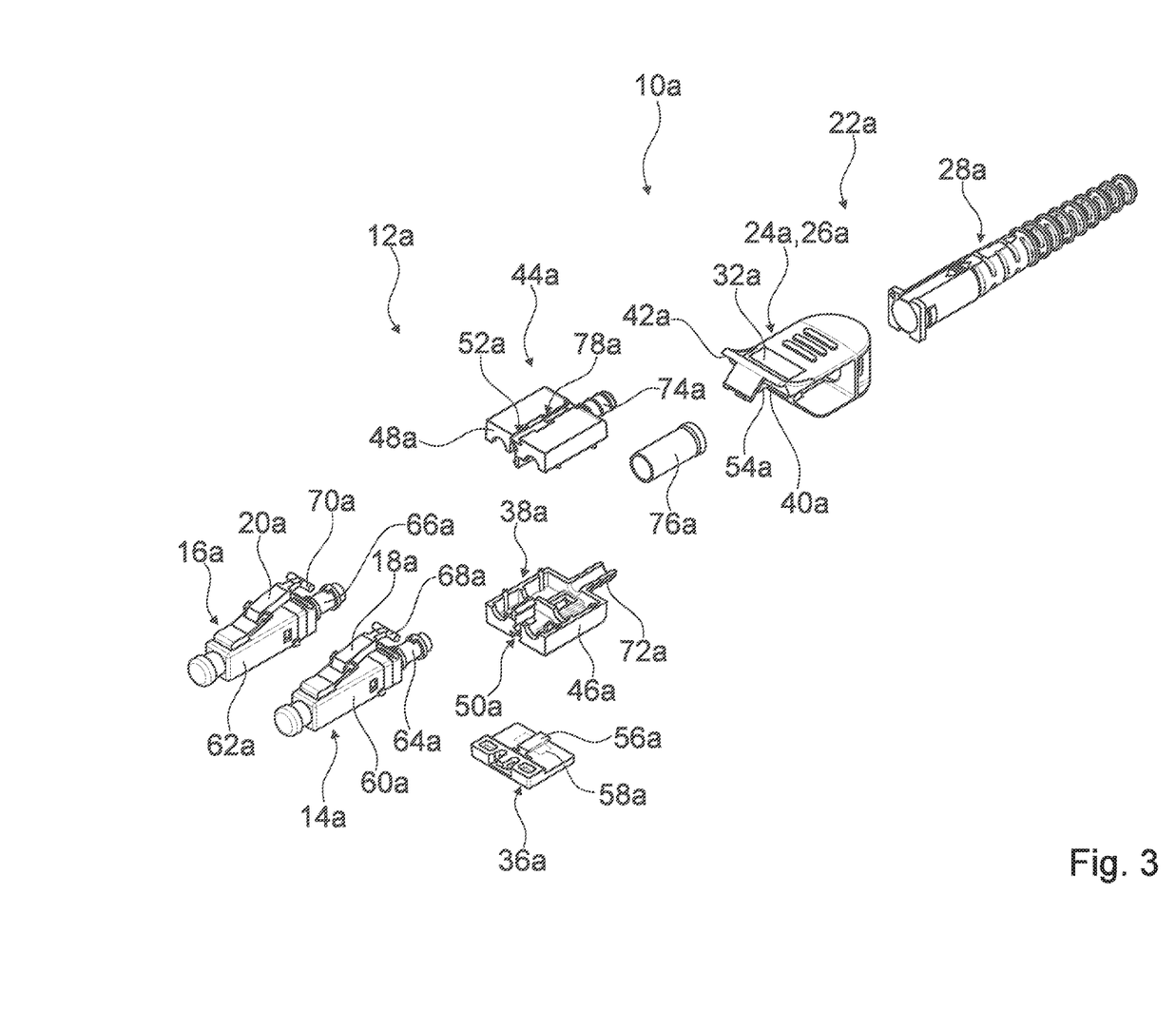

FIGS. 1 to 3 show a plug connector 10a, which is exemplarily embodied as an optical plug connector, in a first perspective view obliquely from above (cf. FIG. 1), in a second perspective view obliquely from below (cf. FIG. 2) and in an exploded view (cf. FIG. 3). The plug connector 10a is implemented as a duplex plug connector, in the present case in particular as an LC duplex plug connector. Alternatively a plug connector could also be implemented as an electrical plug connector or the like. A plug connector could principally also be embodied as a simplex plug connector.

The plug connector 10a comprises a plug unit 12a. The plug unit 12a is provided for coupling to at least one further plug unit (not shown), which is equivalent to the plug unit 12a. The further plug unit is in the present case equivalent to a plug socket. The plug unit 12a is provided for establishing an optical connection between two objects.

For this purpose the plug unit 12a comprises at least one plug element 14a, 16a. In the present case the plug unit 12a comprises two plug elements 14a, 16a. Principally, however, a plug unit could also comprise precisely one plug element and/or three plug elements. The plug elements 14a, 16a are at least substantially structurally identical. The plug elements 14a, 16a are respectively embodied as LC plug elements.

The plug elements 14a, 16a each comprise a plug base body 60a, 62a (cf. in particular FIG. 3). The base plug bodies 60a, 62a are embodied elongate. Herein the base plug bodies 60a, 62a respectively define a longitudinal extension direction of the respective plug element 14a, 16a. The longitudinal extension directions are herein oriented in parallel to each other. The base plug bodies 60a, 62a are furthermore respectively embodied at least substantially rectangular-cuboid shaped. The base plug bodies 60a, 62a are respectively embodied as receiving bodies.

The plug elements 14a, 16a further comprise respectively one connection element 64a, 66a. The connection elements 64a, 66a are at least partly arranged inside the respective plug base body 60a, 62a. The connection elements 64a, 66a are in the present case provided for coupling the respective plug element 14a, 16a with a holding unit 44a.

The plug elements 14a, 16a further each comprise respectively one locking element 18a, 20a. The locking elements 18a, 20a are respectively implemented as locking arms, in the present case in particular latch arms and/or latch lugs. A first end of the locking elements 18a, 20a is respectively arranged at, in particular fixated to, a respective plug base body 60a, 62a. A second end of the locking elements 18a, 20a, which is in particular spaced apart from the plug base body 60a, 62a, respectively comprises at least one pin element 68a, 70a. The locking elements 18a, 20a are provided for locking the respective plug element 14a, 16a. In the present case the locking elements 18a, 20a serve for locking the plug unit 12a in the further plug unit.

A plug element 14a of the plug elements 14a, 16a hence comprises in the present case a plug base body 60a of the base plug bodies 60a, 62a and a locking element 18a of the locking elements 18a, 20a. Furthermore a further plug element 16a of the plug elements 14a, 16a comprises a further plug base body 62a of the base plug bodies 60a, 62a as well as a further locking element 20a of the locking elements 18a, 20a.

A longitudinal axis of the plug element 14a and a longitudinal axis of the further plug element 16a extend in the longitudinal extension directions. The longitudinal axis of the plug element 14a and the longitudinal axis of the further plug element 16a are herein oriented at least substantially parallel to each other.

Beyond this the plug unit 12a comprises the holding unit 44a. The holding unit 44a is provided for holding the plug elements 14a, 16a. The holding unit 44a is herein provided for receiving the connection elements 64a, 66a, in particular in such a way that the plug elements 14a, 16a are rotatable with respect to the holding unit 44a.

For this purpose the holding unit 44a comprises two holding parts 46a, 48a. The holding parts 46a, 48a are embodied separate from each other. It is possible to separate and/or space apart the holding parts 46a, 48a from each other. The holding parts 46a, 48a are embodied in a one-part implementation each. The holding parts 46a, 48a are embodied at least substantially in a shape of a rectangular cuboid. The holding parts 46a, 48a are at least substantially mirror-symmetrical. In the present case the holding parts 46a, 48a are at least substantially structurally identical. The holding parts 46a, 48a are in a connected state provided for holding the plug elements 14a, 16a, in particular the connection elements 64a, 66a, in particular in such a way that the plug elements 14a, 16a are rotatable. The holding parts 46a, 48a are herein, in the connected state, connected to each other in a force-fit and/or form-fit fashion. Moreover each of the holding parts 46a, 48a comprises a connection section 72a, 74a. The connection sections 72a, 74a are respectively embodied at least substantially demi-cylinder shaped and form, in particular in the connected state, an at least substantially cylinder-shaped, in particular circular cylinder-shaped, common connection section. Alternatively it is conceivable to implement a holding unit in one part and/or to implement holding parts differing from each other.

The holding unit 44a further comprises a cable connector 76a. The cable connector 76a is embodied as a clamping connector. The cable connector 76a is embodied as a sleeve, in the present case in particular as a crimp sleeve. The cable connector 76a serves for a force-fit connection, in particular by means of a crimp connection, of the holding parts 46a, 48a, in particular of the connection sections 72a, 74a of the holding parts 46a, 48a, to at least one cable, in the present case in particular an optical waveguide cable. Principally, however, a cable connector could be dispensed with. In addition it is conceivable to embody a cable connector in a one-part implementation with a holding unit. Furthermore a cable connector could be embodied as any type of a clamping connector differing from a crimp sleeve.

Beyond this the plug unit 12a comprises at least one dovetail-connection element 50a, 52a. In the present case the plug unit 12a comprises precisely two dovetail-connection elements 50a, 52a. The dovetail-connection elements 50a, 52a are at least substantially mirror-symmetrical. In the present case the dovetail-connection elements 50a, 52a are at least substantially structurally identical. The dovetail-connection elements 50a, 52a are in an assembled state arranged on respectively opposite sides of the plug unit 12a.

The dovetail-connection elements 50*a*, 52*a* are each embodied as a dovetail guidance. The dovetail-connection elements 50*a*, 52*a* are herein respectively embodied as a depression.

In the present case, precisely one of the dovetail-connection elements 50*a*, 52*a* is arranged on each of the holding parts 46*a*, 48*a*. Herein a first dovetail-connection element 50*a* of the dovetail-connection elements 50*a*, 52*a* is arranged on a first holding part 46*a* of the holding parts 46*a*, 48*a* and a second dovetail-connection element 52*a* of the dovetail-connection elements 50*a*, 52*a* is arranged on a second holding part 48*a* of the holding parts 46*a*, 48*a*. The dovetail-connection elements 50*a*, 52*a* further respectively extend over an entire longitudinal extension of the holding parts 46*a*, 48*a*. Alternatively, however, a plug unit could also comprise a different number of dovetail-connection elements, e.g. precisely one dovetail-connection element, at least three dovetail-connection elements and/or at least four dovetail-connection elements.

The plug connector 10*a* furthermore comprises an orientation unit 38*a*. The orientation unit 38*a* is embodied in a one-part implementation. The orientation unit 38*a* is in the present case embodied in a one-part implementation with the plug unit 12*a*, in particular the holding unit 44*a*. The orientation unit 38*a* is provided for supporting the plug element 14*a* and the further plug element 16*a* together with the holding unit 44*a*, in particular for the purpose of defining an orientation of the plug element 14*a* and the further plug element 16*a* with respect to each other. The orientation unit 38*a* is provided for changing in an assembly process, in particular toollessly, a minimum distance, in particular an axial distance, between the plug element 14*a* and the further plug element 16*a*. In the present case the orientation unit 38*a* is provided for setting at least two different minimum distances between the plug element 14*a* and the further plug element 16*a*. An adjustment of the different minimum distances is herein carried out manually by way of positioning the plug element 14*a* and the further plug element 16*a* in different longitudinal positions of the holding unit 44*a*, in particular with respect to a longitudinal extension direction of the holding unit 44*a*. The different minimum distance correspond in the present case to different insertion depths of the plug element 14*a* and the further plug element 16*a* in the holding unit 44*a*. Herein a distance between the plug element 14*a* and the further plug element 16*a* may be adjusted by the orientation unit 38*a* in such a way that a medium axial distance of 5.25 mm or 6.25 mm can be achieved between the plug element 14*a* and the further plug element 16*a*. A medium axial distance of 5.25 mm herein corresponds to a Mini LC duplex plug connector. A medium axial distance of 6.25 mm herein corresponds to a Standard LC duplex plug connector. An actual medium axial distance is identifiable by an engraving and/or a symbol at the orientation unit 38*a*. Alternatively, however, an orientation unit could also be implemented separate from a plug unit. Moreover an orientation unit could be provided for adjusting at least three different minimum distances between two plug elements. Also, an orientation unit could principally also be done without.

Moreover the plug connector 10*a* comprises an actuation unit 22*a*. The actuation unit 22*a* is in the present case embodied in a multi-part implementation. The actuation unit 22*a* is in the assembled state coupled with the plug unit 12*a* in a force-fit and/or form-fit fashion. In the present case the actuation unit 22*a* is in the assembled state connected to the plug unit 12*a* by means of a dovetail connection. The actuation unit 22*a* is herein optionally connectable to one of the dovetail-connection elements 50*a*, 52*a*. The actuation unit 22*a* is movably supported by means of the dovetail connection. The actuation unit 22*a* is, in particular in an uncoupled state of the plug unit 12*a* from the further plug unit, at least provided for locking the plug unit 12*a*. In addition, the actuation unit 22*a* is embodied at least as an unlocking unit and is, in particular in a coupled state of the plug unit 12*a* with the further plug unit, at least provided for unlocking the plug unit 12*a*, in particular in such a way that the plug unit 12*a* is removable from the further plug unit.

For this purpose the actuation unit 22 comprises at least one actuation element 24*a*, 26*a*, 28*a*. An actuation element 24*a* of the actuation elements 24*a*, 26*a*, 28*a* is allocated to the plug element 14*a* of the plug elements 14*a*, 16*a*.

The actuation element 24*a* comprises for connecting to the plug unit 12*a*, in the present case in particular the holding unit 44*a*, a dovetail-connection element 54*a* which is implemented corresponding to the dovetail-connection elements 50*a*, 52*a* of the plug unit 12*a* and which is, in particular in the assembled state, connected to the dovetail-connection elements 50*a*, 52*a* of the plug unit 12*a*. In this the actuation element 24*a* engages around the holding unit 44*a* at least to a major part. The actuation element 24*a* is linearly movable and/or displaceable in a longitudinal extension direction of the plug element 14*a*.

The actuation element 24*a* further comprises in the present case a latch element (not shown). The latch element is arranged on a side of the actuation element 24*a* that faces the holding unit 44*a*. The latch element is herein arranged centrally on the actuation element 24*a*. The latch element is provided for acting together with at least one latch recess 78*a* of the holding unit 44*a* that faces the actuation element 24*a* to define a maximum movement distance and/or displacement distance of the actuation element 24*a*.

Furthermore, in a fully assembled state the actuation element 24*a* contacts the locking element 18*a* directly. The actuation element 24*a* is herein provided for actuating the locking element 18*a*.

Figure 4:
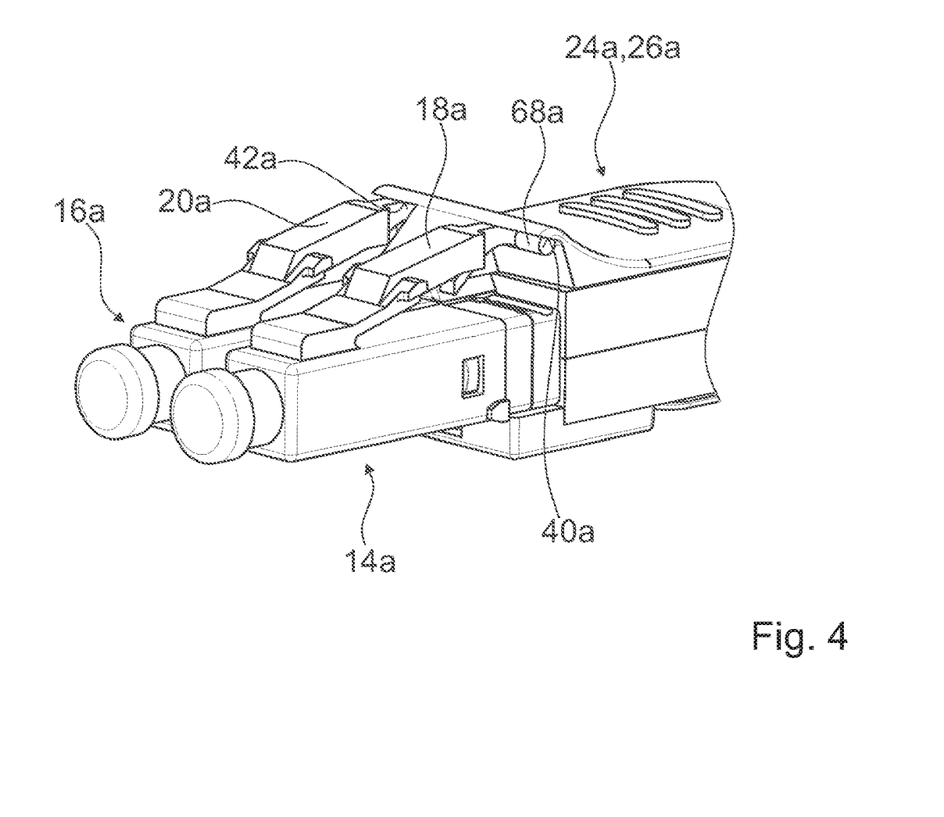

For this purpose the actuation element 24*a* comprises a run-on slope 40*a* (cf. also FIG. 4). In the fully assembled state the run-on slope 40*a* contacts the pin element 68*a* of the locking element 18*a*. The actuation element 24*a* is provided for exerting, in a translational displacement of the actuation element 24*a*, a force on the pin element 68*a* of the locking element 18*a* to move the locking element 18*a* toward the plug base body 60*a*, thus facilitating and/or releasing a locking of the locking element 18*a*. Alternatively or additionally an actuation element could also be provided for locking a locking element.

A further actuation element 26*a* of the actuation elements 24*a*, 26*a*, 28*a* is allocated to the further plug element 16*a* of the plug elements 14*a*, 16*a*. The further actuation element 26*a* is in the present case connected to the actuation element 24*a* in a one-part implementation, in particular in such a way that the further actuation element 26*a* and the actuation element 24*a* form a common structural element, in particular the same structural element. Alternatively, however, a further actuation element could also be embodied separate from an actuation element.

Therefore the further actuation element 26*a* comprises for connecting to the plug unit 12*a*, in the present case in particular the holding unit 44*a*, the dovetail-connection element 54*a* which is implemented corresponding to the dovetail-connection elements 50*a*, 52*a* of the plug unit 12*a* and which is, in particular in the assembled state, connected to the dovetail-connection elements 50*a*, 52*a* of the plug unit 12*a*. Moreover the further actuation element 26*a* engages around the holding unit 44a at least to a major part. Beyond this the further actuation element 26a is linearly movable and/or displaceable in a longitudinal extension direction of the further plug element 16a.

Furthermore the further actuation element 26a comprises the latch element (not shown), which is in particular arranged on a side of the further actuation element 26a that faces the holding unit 44a and is provided for acting together with the latch recess 78a of the holding unit 44a to define a maximum movement distance and/or displacement distance of the further actuation element 26a.

In a fully assembled state, the further actuation element 26a also contacts the further locking element 20a directly. The further actuation element 26a is herein provided for actuating the further locking element 20a.

For this purpose the further actuation element 26a comprises a further run-on slope 42a (cf. also FIG. 4). The further run-on slope 42a contacts in the fully assembled state the pin element 70a of the further locking element 20a. The further actuation element 26a is provided for exerting, in a translational displacement of the further actuation element 26a, which is in particular carried out uniformly with the translational displacement of the actuation element 24a, a force onto the pin element 70a of the further locking element 20a to move the further locking element 20a toward the further plug base body 62a, thus in particular allowing and/or releasing a locking of the further locking element 70a. Alternatively or additionally, however, an actuation element may also be provided for locking a locking element.

An additional actuation element 28a of the actuation elements 24a, 26a, 28a is allocated to the plug element 14a and the further plug element 16a. The additional actuation element 28a is embodied as a cable anti-kink element. The additional actuation element 28a is in the present case made of a thermoplast and has a plurality of bending recesses, as a result of which the additional actuation element 28a is in particular movable in all directions up to a defined and/or definable radius and effectively protects the at least one cable from bending. The additional actuation element 28a is indirectly connected to the locking element 18a and to the further locking element 20a. The additional actuation element 28a is herein connected to the actuation element 24a and to the further actuation element 26a in a force-fit and/or form-fit fashion. The additional actuation element 28a is free of a direct contact to the locking element 18a and the further locking element 20a.

The additional actuation element 28a is provided for optionally actuating, in the present case in particular locking, unlocking and/or releasing, the locking element 18a and the further locking element 20a. For the purpose of actuating the locking element 18a and the further locking element 20a, the additional actuation element 28a is translationally displaceable, in particular displaceable linearly in a longitudinal extension direction of the plug element 14a and the further plug element 16a, with respect to the plug unit 12a. In the present case the additional actuation element 28a is provided for transferring an, in particular translational, tension force, which is exerted onto the additional actuation element 28a, onto the actuation element 24a and the further actuation element 26a, in particular in such a way that the actuation element 24a actuates the locking element 18a and the further actuation element 26a actuates the further locking element 20a, thus in particular allowing and/or releasing in the present case in particular a locking of the plug unit 12a. Alternatively an additional actuation element could be provided for allowing a locking of a plug unit. The additional actuation element 28a thus has in the present case a double function. On the one hand the additional actuation element 28a allows an effective anti-kink protection in case of a tension applied to the at least one cable in any direction, and on the other hand the additional actuation element 28a allows an unplugging and/or plug-in of the plug connector 10a via an axial force exerted on the additional actuation element 28a. This allows achieving an advantageously easy actuating of a plug connector even in cramped space and/or in case of a plurality of plug connectors being arranged side by side. Alternatively, however, an actuation unit could also comprise precisely one actuation element or precisely two actuation elements. In particular in case of a plug connector embodied as a simplex plug connector, in this case a further actuation element could be dispensed with. Moreover an additional actuation element could be dispensed with. Furthermore an additional actuation element could principally also be embodied in a one-part implementation with an actuation element and/or with a further actuation element. It is also conceivable to embody an entire actuation unit in a one-part implementation.

Moreover, in the present case the actuation unit 22a is implemented in such a way that, in a fully assembled state of the actuation element 24a, the plug element 14a is rotatable, in particular toollessly rotatable, about the longitudinal axis of the plug element 14a with respect to the actuation element 24a. The plug element 14a is herein rotatable by at least 180°.

In the present case the actuation unit 22a is furthermore implemented in such a way that the further plug element 16a is in a fully assembled state of the further actuation element 26a rotatable, in particular toollessly rotatable, about the longitudinal axis of the further plug element 16a with respect to the further actuation element 26a. The further plug element 16a is herein rotatable by at least 180°.

In the present case the plug element 14a and the further plug element 16a are herein rotatable in respectively opposite directions, viewed in a direction of the longitudinal axis of the plug element 14a and/or of the longitudinal axis of the further plug element 16a. In this way a polarity of the plug elements 14a, 16a can be changed in an advantageously simple manner, wherein, in particular in the present case a rotation, in particular by 180°, of the actuation element 24a and/or of the further actuation element 26a is additionally required. Moreover an axial distance between the plug elements 14a, 16a is advantageously variable. It is also conceivable to implement an actuation element and/or a further actuation element of an actuation unit mirror-symmetrically, in particular in such a way that run-on slopes are arranged on respectively opposite sides of the actuation element and/or of the further actuation element, which in particular allows dispensing with a rotation, in particular an additional rotation, of the actuation element and/or of the further actuation element, in particular when changing a polarity of a plug unit. Beyond this, a plug element and/or a further plug element could principally also be rotatable about a transverse axis.

In the present case the plug connector 10a further comprises an optical display unit 30a. The display unit 30a is arranged entirely at the actuation unit 22a, in the present case in particular at the actuation element 24a and/or the further actuation element 26a. The display unit 30a is herein embodied at least partly in a one-part implementation with the actuation unit 22a. The display unit 30a is provided for displaying different kinds of display information.

For this purpose the display unit 30a comprises at least one display element 32a, 34a. In the present case the display unit 30a comprises at least two display elements 32a, 34a.

A first display element 32a of the display elements 32a, 34a is in an assembled state and/or operation state arranged on a same side of the plug connector 10a as the locking element 18a and/or the further locking element 20a. The first display element 32a is provided for displaying a first display information. The first display information is herein different from a trademark logo. The first display element 32a is implemented as an inscription space and is in particular inscribable by a user on requirement.

A second display element 34a of the display elements 32a, 34a is in an assembled state and/or operation state arranged on a side of the plug connector 10a that is situated opposite the locking element 18a and/or the further locking element 20a. The second display element 34a is arranged on a side of the actuation element 24a and/or of the further actuation element 26a that is situated opposite the first display element 32a. The second display element 34a is provided for displaying a second display information. The second display information is herein different from a trademark logo. The second display element 34a is in the present case provided for displaying a QR code. Alternatively a display unit could also comprise precisely one display element, at least three display elements and/or at least four display elements. It is also conceivable to implement at least one display element as a lighting element or the like. A display unit could also additionally comprise at least one display element which may be provided for displaying a trademark logo. Furthermore a display unit could also be embodied separately from an actuation unit. Beyond this, a display unit could principally also be dispensed with.

The plug connector 10a further comprises in the present case an identification unit 36a. The identification unit 36a is implemented electrical and/or electronical. The identification unit 36a is at least substantially rectangular-cuboid shaped and/or plate-shaped.

The identification unit 36a is in the assembled state connected to the plug unit 12a in a force-fit and/or form-fit fashion. In the present case the identification unit 36a is in the assembled state connected to the plug unit 12a by means of a further dovetail connection. The identification unit 36a is herein optionally connectable to one of at least two further dovetail-connection elements, which are in this case in particular identical to the dovetail-connection elements 50a, 52a.

For this purpose the identification unit 36a comprises a further dovetail-connection element 56a, which is embodied corresponding to the dovetail-connection elements 50a, 52a of the plug unit 12a and which is, in particular, in the assembled state connected to the dovetail-connection elements 50a, 52a of the plug unit 12a. Herein the identification unit 36a and the actuation unit 22a, in particular the actuation element 24a and the further actuation element 26a, are in the assembled state connected to dovetail-connection elements 50a, 52a of the plug unit 12a which are situated opposite each other. Alternatively, however, a plug unit could also comprise additional dovetail-connection elements for an identification unit.

The identification unit 36a is moreover provided for supplying, in at least one application state, at least one identification information, in particular for unambiguously identifying the plug connector 10a. The identification information corresponds in the present case to an electro-magnetic identification signal.

For this purpose the identification unit 36a comprises at least one RFID transponder with at least one RFID chip 58a. Alternatively, however, an identification unit could also be embodied as any kind of identification unit differing from an RFID transponder, e.g. as a radio communication transponder, as a WLAN transponder and/or as a Bluetooth transponder. Moreover, an identification unit could principally also be dispensed with.

In FIGS. 5 to 9 further exemplary embodiments of the invention are shown. The following descriptions and the drawings are substantially limited to the differences between the exemplary embodiments, wherein regarding structural components having the same denomination, in particular regarding structural components having the same reference numerals, principally the drawings and/or the description of the other exemplary embodiments, in particular of FIGS. 1 to 4, may be referred to. For the purpose of distinguishing the exemplary embodiments, the letter a is set after the reference numerals of the exemplary embodiment in FIGS. 1 to 4. In the exemplary embodiments of FIGS. 5 to 9 the letter a has been substituted by the letters b and c.

Figure 5:
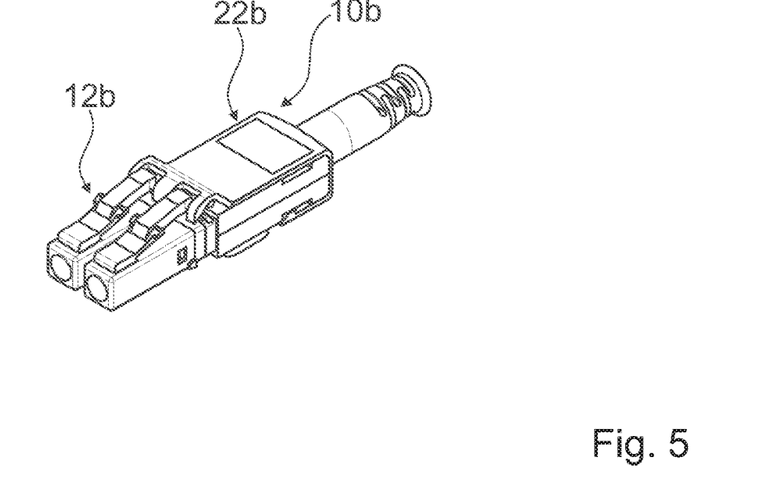
Figure 6:
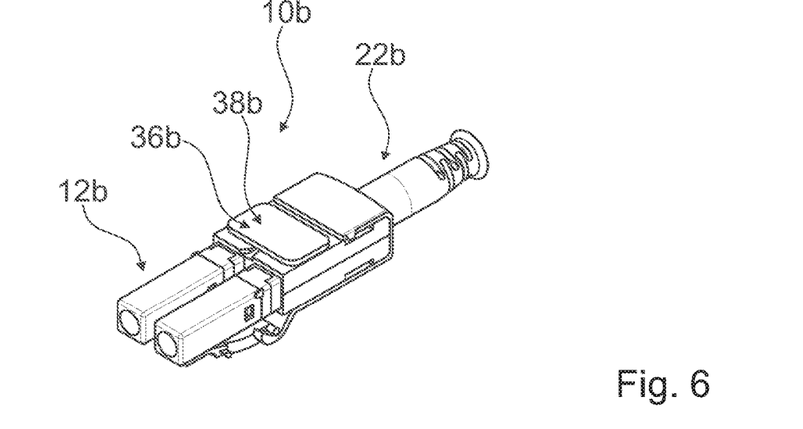
Figure 7:
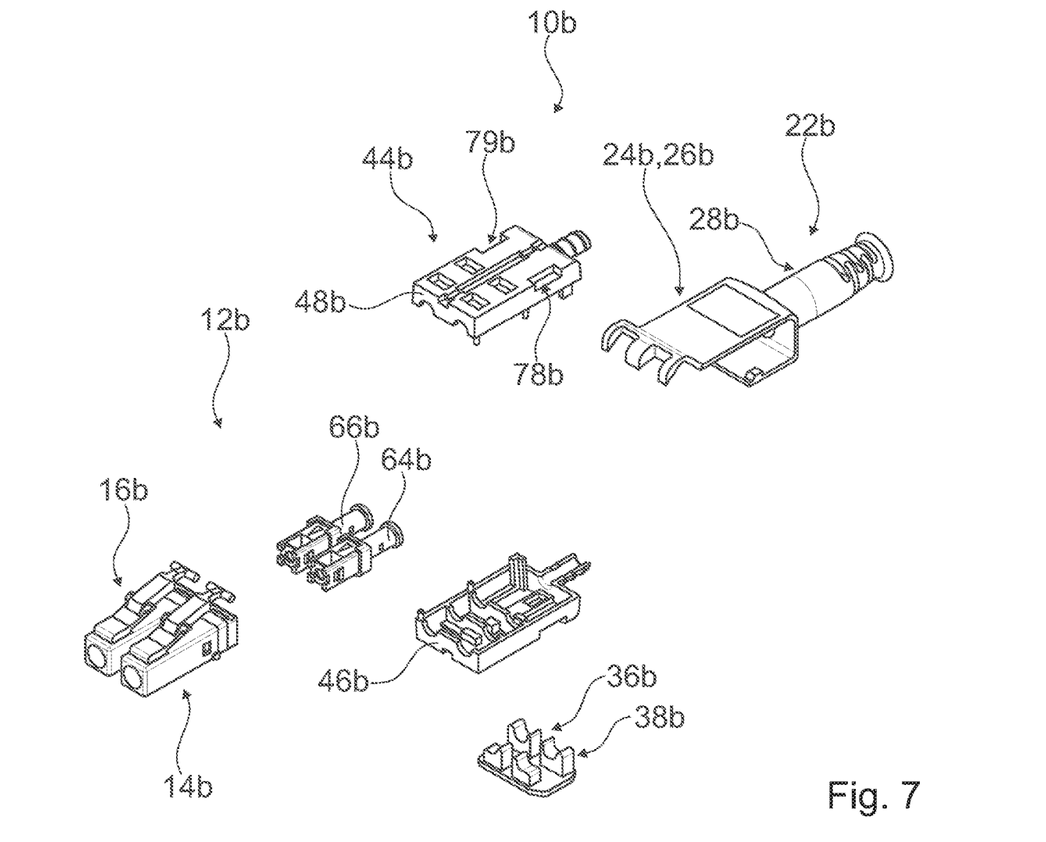

In FIGS. 5 to 7 a further exemplary embodiment of the invention is shown. The exemplary embodiment of FIGS. 5 to 7 has the letter b.

In the present case an actuation unit 22b is embodied in a one-part implementation. Thus an actuation element 24b, a further actuation element 26b and an additional actuation element 28b of the actuation unit 22b are connected to each other in a one-part implementation, in particular in such a way that the actuation element 24b, the further actuation element 26b and the additional actuation element 28b form a common structural component, in particular the same structural component.

The actuation element 24b and/or the further actuation element 26b further comprises two latch elements (not shown), which are in particular respectively provided for acting together with a latch recess 78b, 79b in a holding unit 44b of a plug unit 12b to define a maximum movement distance and/or displacement distance of the actuation element 24b and the further actuation element 26b.

Beyond this, an orientation unit 38b is embodied separate from the plug unit 12b. The orientation unit 38b is in an assembled state connected to the plug unit 12b, in particular the holding unit 44b, in a force-fit and/or form-fit fashion.

An adjustment of different minimum distances is herein carried out manually by means of different fixations of the orientation unit 38b, in particular in a first orientation of the orientation unit 38b and/or with respect to an orientation of the orientation unit 38b that is rotated by 180° perpendicularly relative to a longitudinal extension direction of a plug element 14b and/or of a further plug element 16b.

Furthermore, the orientation unit 38b is in this case embodied in a one-part implementation with an identification unit 36b. Alternatively or additionally an orientation unit could also be embodied in a one-part implementation with a display unit. It is moreover conceivable to implement an identification unit separately from an orientation unit.

Figure 8:
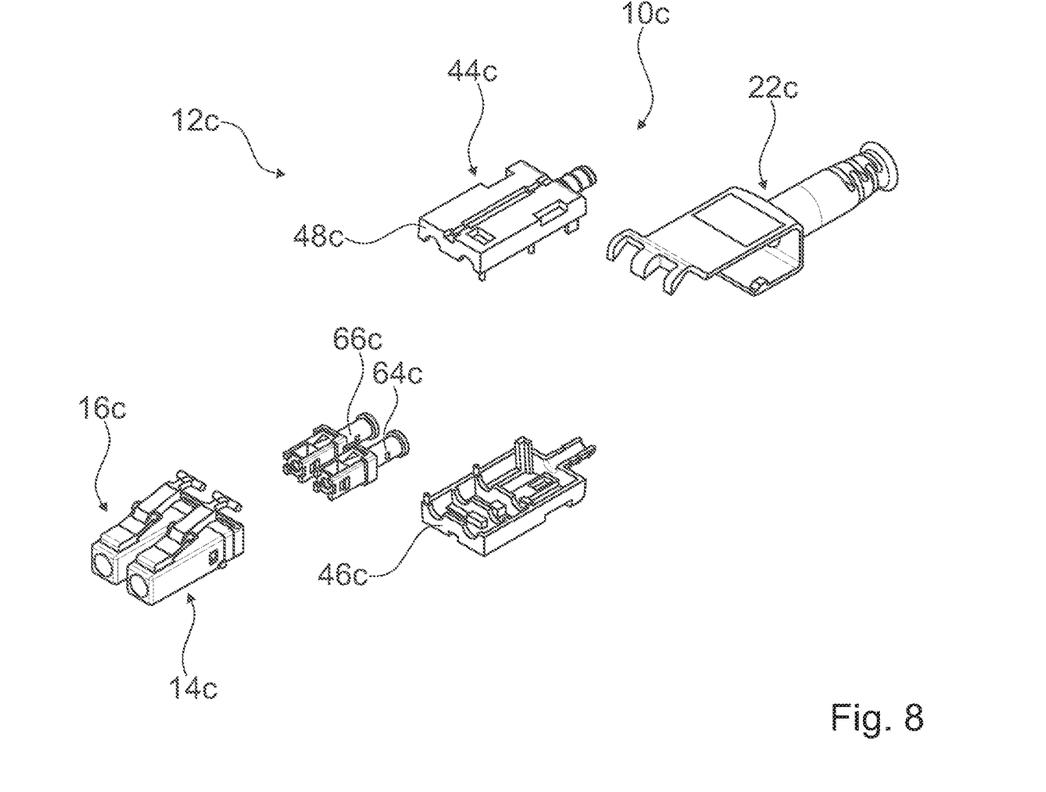
Figure 9:
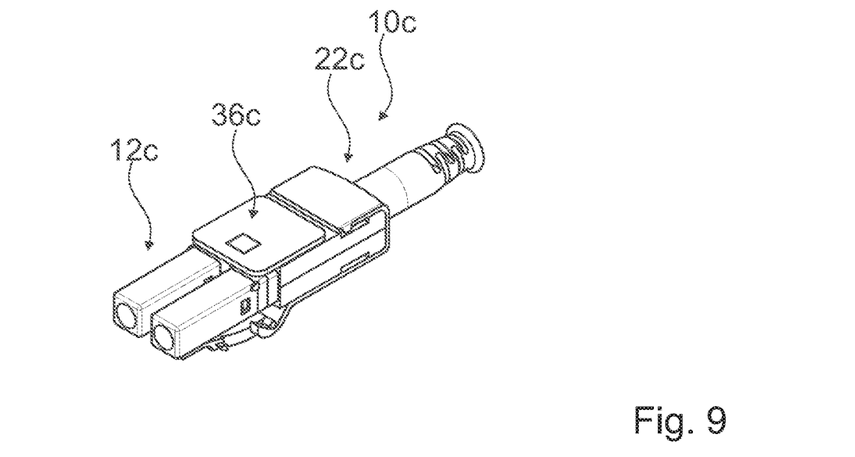

In FIGS. 8 and 9 a further exemplary embodiment of the invention is shown. The exemplary embodiment of FIGS. 8 and 9 has the letter c. The further exemplary embodiment of FIGS. 8 and 9 differs from the preceding exemplary embodiment at least substantially by an implementation of an identification unit 36c.

Herein the identification unit 36c corresponds at least substantially to an identification unit 36a of the first exemplary embodiment, while an actuation unit 22c corresponds at least substantially to an actuation unit 22b of the preceding exemplary embodiment.

The invention claimed is:
1. A plug connector, in particular an optical plug connector, with a plug unit comprising at least one plug element which has at least one locking element, and with an actuation unit comprising at least one actuation element which is translationally displaceable with respect to the plug unit for the purpose of actuating the locking element, wherein the actuation unit includes at least one additional actuation element that is provided for actuating the locking element, the additional actuation element is a cable anti-kink element, and the additional actuation element is separate from the actuation element.

2. The plug connector according to claim 1, wherein the actuation unit is in an assembled state connected to the plug unit via a dovetail connection.

3. The plug connector according to claim 2, wherein the plug unit comprises at least two dovetail-connection elements and the actuation unit is optionally connectable to one of the dovetail-connection elements.

4. The plug connector according to claim 3, wherein the dovetail-connection elements are arranged on respectively opposite sides of the plug unit.

5. The plug connector according to claim 1, comprising an optical display unit having at least one display element which is provided for displaying at least one display information that differs from a trademark logo and is an inscription space.

6. The plug connector according to claim 5, wherein the display unit is arranged at the actuation unit.

7. The plug connector according to claim 6, wherein the display unit comprises at least one display element which is in an assembled state arranged on a same side of the actuation unit and/or of the plug unit as the locking element.

8. The plug connector according to claim 7, wherein the display unit comprises at least one further display element which is in an assembled state arranged on a side of the actuation unit and/or of the plug unit that is situated opposite the locking element.

9. The plug connector according to claim 1, comprising an identification unit which is provided for supplying, in at least one operation state, at least one identification information and is provided for unambiguously identifying the plug connector and includes at least one transponder.

10. The plug connector according to claim 9, wherein the identification unit is connected to the plug unit via a further dovetail connection.

11. The plug connector according to claim 10, wherein the plug unit comprises at least two further dovetail-connection elements and the identification unit is optionally connectable to one of the further dovetail-connection elements.

12. The plug connector according to claim 11, wherein the further dovetail-connection elements are identical to the dovetail-connection elements.

13. The plug connector according to claim 9, wherein the identification unit and the actuation unit are in the assembled state connected to dovetail-connection elements of the plug unit which are situated opposite each other.

14. The plug connector according to claim 1, wherein the plug unit comprises at least one further plug element with at least one further locking element, and the actuation unit comprises at least one further actuation element, which is translationally displaceable with respect to the plug unit for the purpose of actuating the further locking element.

15. The plug connector according to claim 14, wherein the further actuation element is connected to the actuation element in a one-part implementation.

16. The plug connector according to claim 14, wherein the further plug element is, in a fully assembled state of the further actuation element, rotatable with respect to the further actuation element.

17. The plug connector according to claim 14, comprising an orientation unit, which is provided for changing in an assembly process a minimum distance between the plug element and the further plug element.

18. The plug connector according to claim 17, wherein the orientation unit is embodied in a one-part implementation with the identification unit.

19. A plug connector, in particular, an optical plug connector, comprising a plug unit including at least one plug element, which has at least one locking element and at least one holding unit for holding the plug element, and an actuation unit including at least one actuation element, which is translationally displaceable with respect to the plug unit for actuating the locking element, wherein the actuation unit is, in an assembled state, connected to the holding unit via a dovetail connection.

20. The plug connector according to claim 19, wherein the plug unit includes at least two dovetail-connection elements, the actuation unit is optionally connectable to one of the dovetail-connection elements, and the holding unit has at least two holding parts, which are separate, wherein precisely one of the dovetail-connection elements is arranged on each of the holding parts.

* * * * *